United States Patent [19]
Peterson et al.

[11] Patent Number: 5,495,530
[45] Date of Patent: Feb. 27, 1996

[54] LOW POWER EMERGENCY TELEPHONE MODE

[75] Inventors: Joseph W. Peterson; Dale E. Gulick, both of Austin, Tex.

[73] Assignee: Advanced Micro Devices, Inc., Sunnyvale, Calif.

[21] Appl. No.: 320,778

[22] Filed: Oct. 11, 1994

Related U.S. Application Data

[63] Continuation of Ser. No. 918,631, Jul. 21, 1992, abandoned.

[51] Int. Cl.⁶ .................................................. H04M 11/02
[52] U.S. Cl. ........................ 379/418; 379/413; 379/433; 379/399
[58] Field of Search .................................... 379/418, 413, 379/433, 399, 322, 61, 200

[56] References Cited

U.S. PATENT DOCUMENTS

| | | | |
|---|---|---|---|
| 4,953,198 | 8/1990 | Daly et al. | 379/61 |
| 5,111,499 | 5/1992 | Umemoto et al. | 379/413 X |
| 5,117,449 | 5/1992 | Metroka et al. | 379/61 X |

OTHER PUBLICATIONS

*Sony* SPP–100 Operating Instruction Manual for Cordless Telephone, 1985.

*Primary Examiner*—Jeffery Hofsass
*Assistant Examiner*—Jacques M. Saint-Surin
*Attorney, Agent, or Firm*—Jenkens & Gilchrist

[57] ABSTRACT

A cordless telephone that may be fully powered by AC main power lines and only partially powered by telephone lines includes structure for producing dual tones, structure for producing dual-tone multifrequency tones from the dual tones, and structure for empowering each of the foregoing in the event of AC main power failure where the only power available passes through the telephone lines.

11 Claims, 6 Drawing Sheets

LOW POWER EMERGENCY TELEPHONE MODE

This is a continuation of application Ser. No. 07/918,631, filed Jul. 21, 1992, now abandoned.

CROSS-REFERENCE TO RELATED APPLICATIONS

This application is related to the following U.S. Patent Applications:

| SERIAL NO. | TITLE | INVENTOR(S) |
| --- | --- | --- |
| (06940/0029; TT0139) | General I/O Port Interrupt Mechanism | Gulick, et al. |
| (06940/0030; TT0140) | Improved External Memory Access Control for a Processing Unit | Gulick, et al. |
| (06940/0031; TT0141) | Method of Weak Pull-up Disable and Mechanism Therefor for Use with Microcontroller in Integrated Circuit and Cordless Telephone Using the Integrated Circuit | Bowles, et al. |
| (06940/0032; TT0142) | Interrupt Mask Disable Circuit and Method | Bowles, et al. |
| (06940/0033; TT0143) | Integrated Circuit and Cordless Telephone Using the Integrated Circuit | Gulick, et al. |
| (06940/0034; TT0144) | Modulator Test System | Peterson, et al. |
| (06940/0035; TT0145) | Keypad Scanner Process and Device and Cordless Telephone Employing the Mechanism | Gulick |
| (06940/0036 TT0146) | Serial Interface Module and Method | Gulick, et al. |
| (06940/0038; TT0148) | In-Circuit Emulation Capability Mode in Integrated Circuit and Cordless Telephone Using the Integrated Circuit | Gulick, et al. |
| (06940/0039; TT0149) | Clock Generator Capable of Shut-down Mode and Clock Generation Method | Peterson, et al. |
| (06940/0040; TT0150) | Signal Averager | Gulick |

All of the related applications are filed on even date herewith, are assigned to the assignee of the present invention, and are hereby incorporated herein in their entirety by this reference thereto.

BACKGROUND OF THE INVENTION

Field of the Invention

The present invention relates to cordless telephones. More particularly, the present invention relates to structure and methods for enabling very low power operation of such telephones.

DESCRIPTION OF RELATED ART

Cordless telephones are well-known in the prior art. They typically include a base station which connects to a standard alternating current (AC) power outlet and a telephone line. This base station communicates by way of radio transmissions with a remote unit. The remote unit is generally a hand-held member or "handset" through which calls may be received and placed via the base station.

Under normal circumstances the power requirements of cordless telephones are satisfied by the standard 120 volt AC "mains". A relatively low level of power can also be derived by cordless telephones from standard telephones lines. In fact, conventional, non-cordless telephones are effectively powered solely from the telephone lines. In the current state of development of cordless telephones, however, the power supplied by the telephone lines is insufficient to empower all functions of cordless telephones.

Occasionally, because of weather problems, accidents downing power lines, and certain other occurrences, the AC power to a cordless telephone through the "mains" may be cut off. If the mains do indeed fail, a cordless telephone can draw power only from the telephone line, which, as previously mentioned, is insufficient to empower all of the telephone's functions. This power restriction requires that some normal functions of the system be disabled. It is extremely important, however, that the cordless telephone retain basic operational capability, i.e., being able to receive and place a call. If cordless telephones were not at least basically functional in emergency (that is, power out) circumstances, cordless telephones would not compare favorably to standard telephones as viable commercial products.

SUMMARY OF THE INVENTION

The present invention provides a cordless telephone especially well-suited to weather emergency, power out situations. According to the teachings of the present invention, such a cordless telephone, which telephone may be fully powered by AC main power lines and only partially powered by telephone lines, includes structure for producing dual tones, structure for producing dual-tone multifrequency tones from the dual tones, and structure for empowering each of the foregoing in the event of AC main power failure where the only power available passes through the telephone lines.

In certain embodiments of the present invention, a dual-tone generator may produce the dual tones. In those certain embodiments of the present invention, or in other embodiments, a digital signal processing engine may produce, and possibly also output, dual-tone multifrequency tones.

Further, in certain embodiments of the cordless telephone according to the teachings of the present invention, the structure for empowering may be a digital signal processing engine control register.

The present invention also provides a method for selectively enabling cordless telephone functions in the event of an AC main line power failure, which method includes the steps of obtaining power for the public switched telephone network line and using that power to enable the cordless telephone hookswitch and dialing mechanism. In embodiments of the method of the present invention the dialing mechanism may also include a keypad scanner associated with a keypad. Also, in embodiments of the method of the present invention the dialing mechanism may include a pulse dialer, and possibly also a dual-tone multi frequency dialer.

Accordingly, it is an object of the present invention to provide a low power, emergency telephone service mode in a cordless telephone base station.

Another object of the present invention is to provide a cordless telephone that can long maintain operational capabilities in the event of AC main power failure.

BRIEF DESCRIPTION OF THE DRAWINGS

For a more complete understanding of the present invention, and for further objects and advantages thereof, refer-

Figure 5:
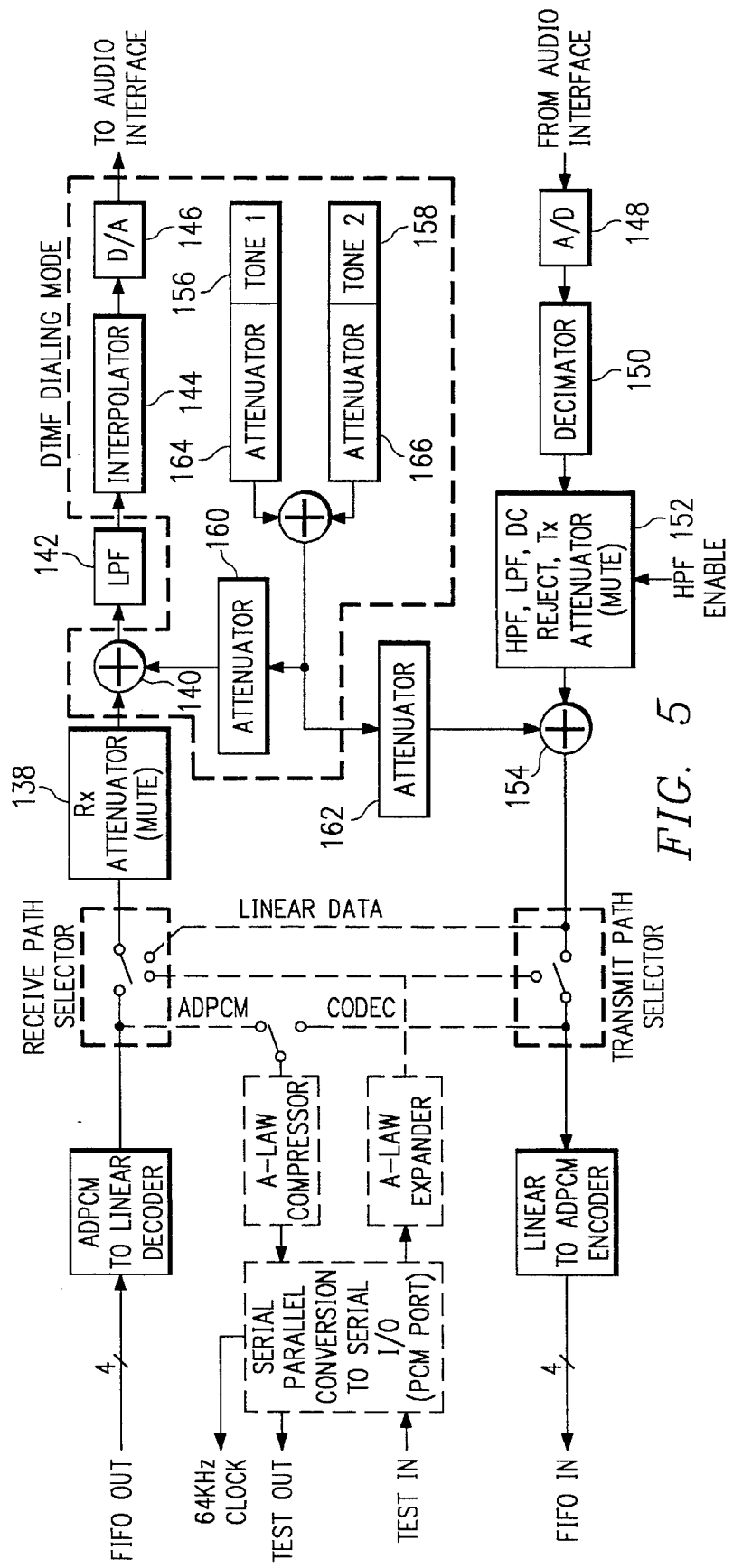
Figure 2:
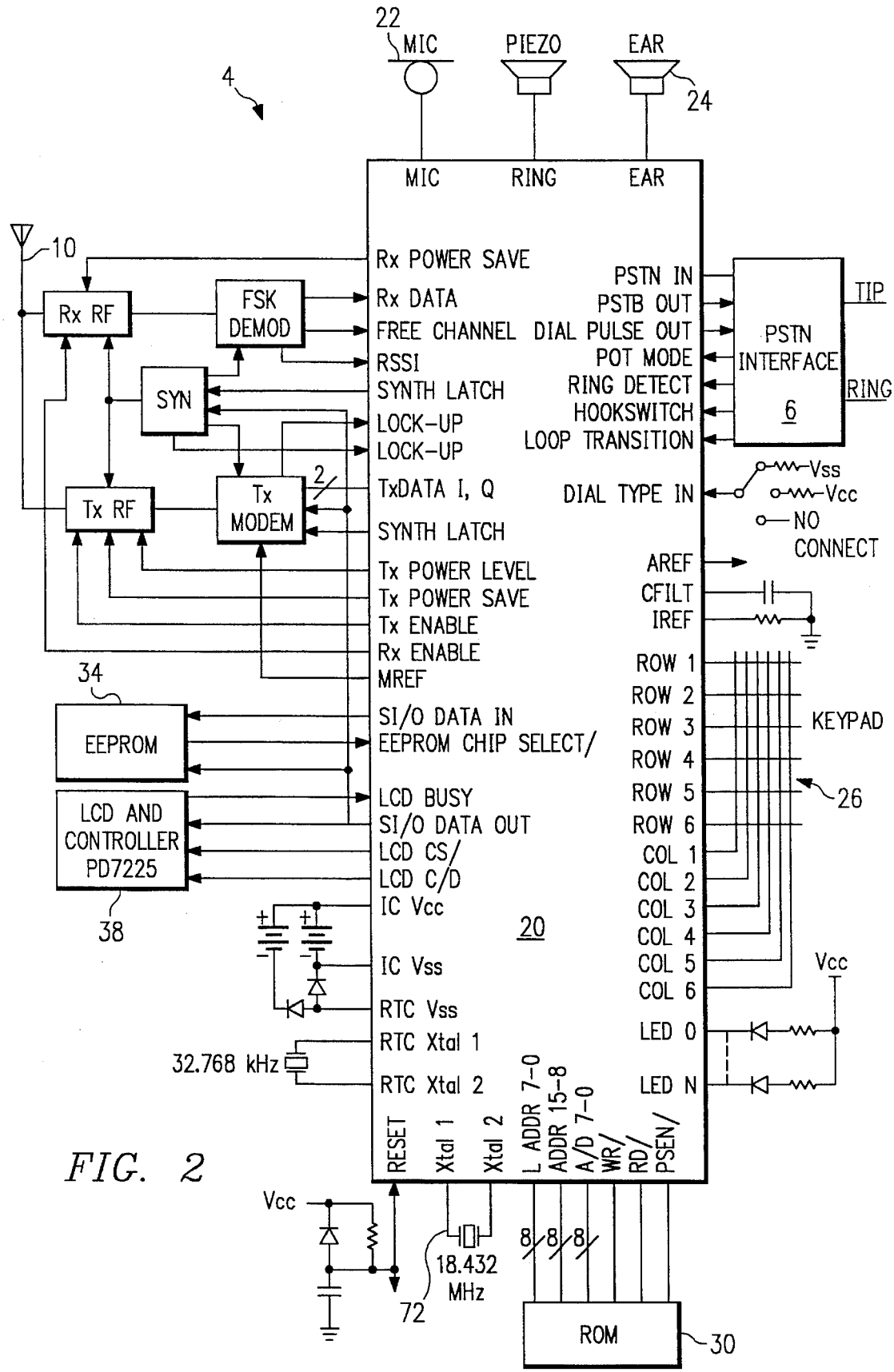
Figure 3A:
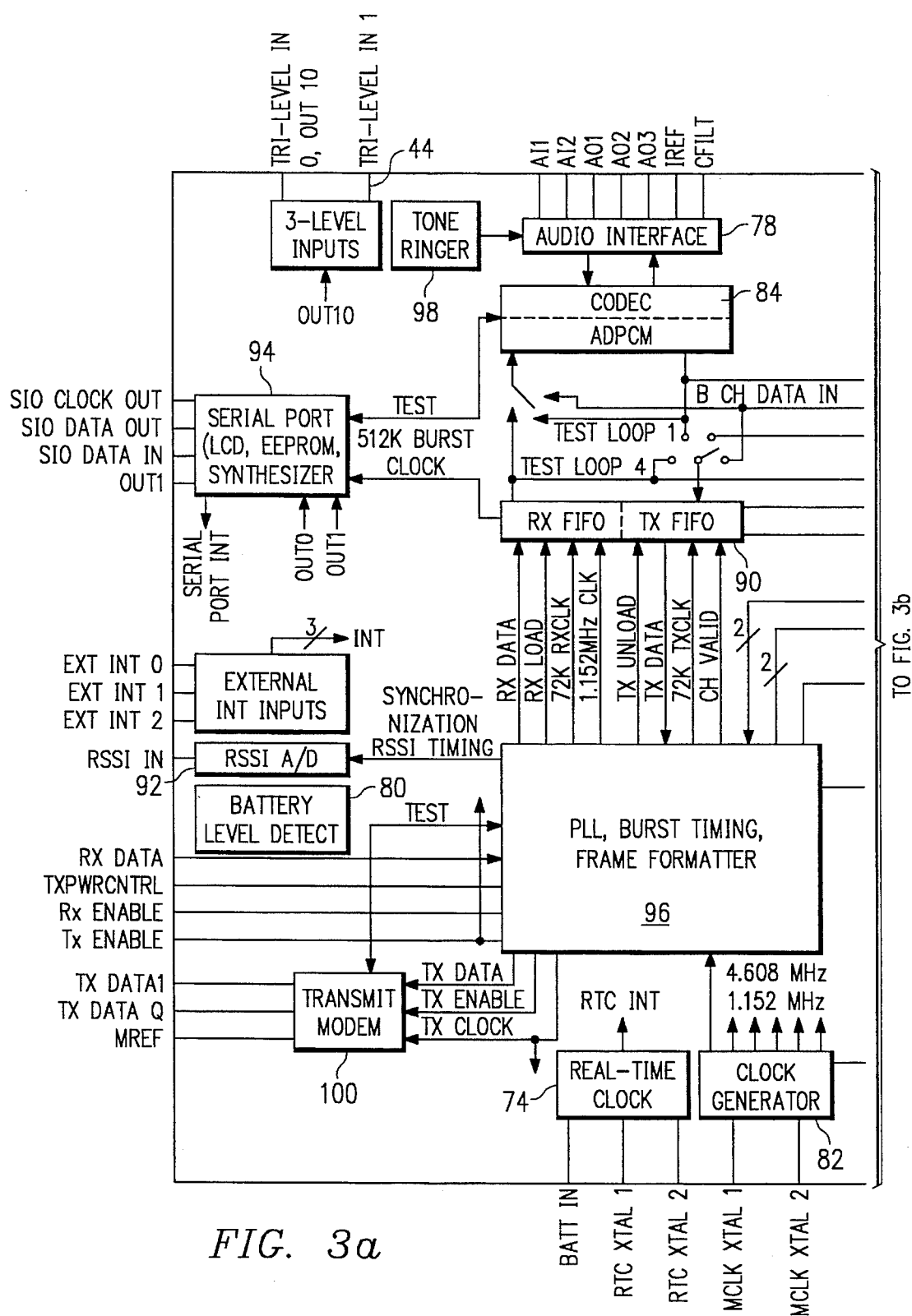
Figure 3B:
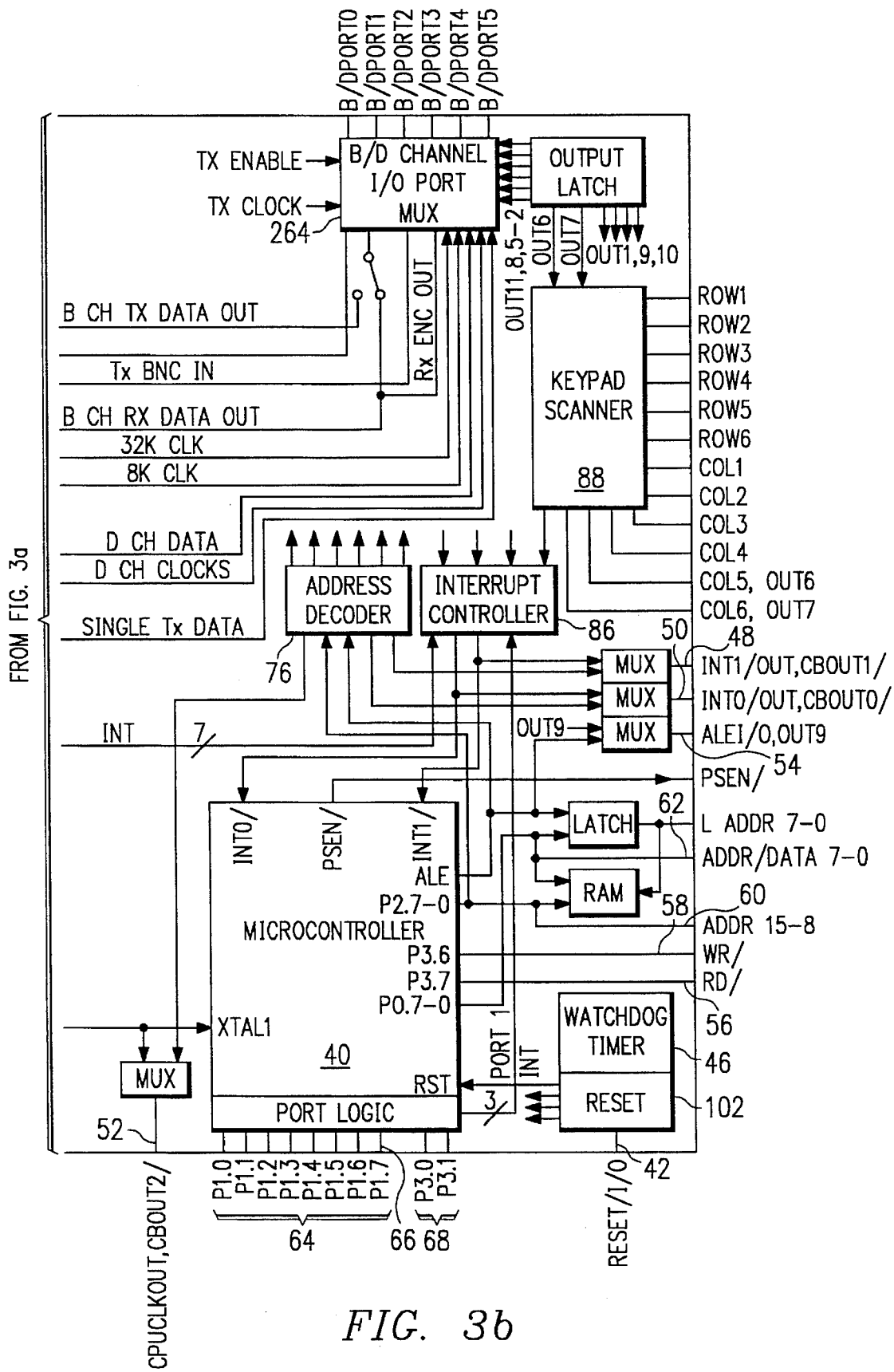
Figure 4:
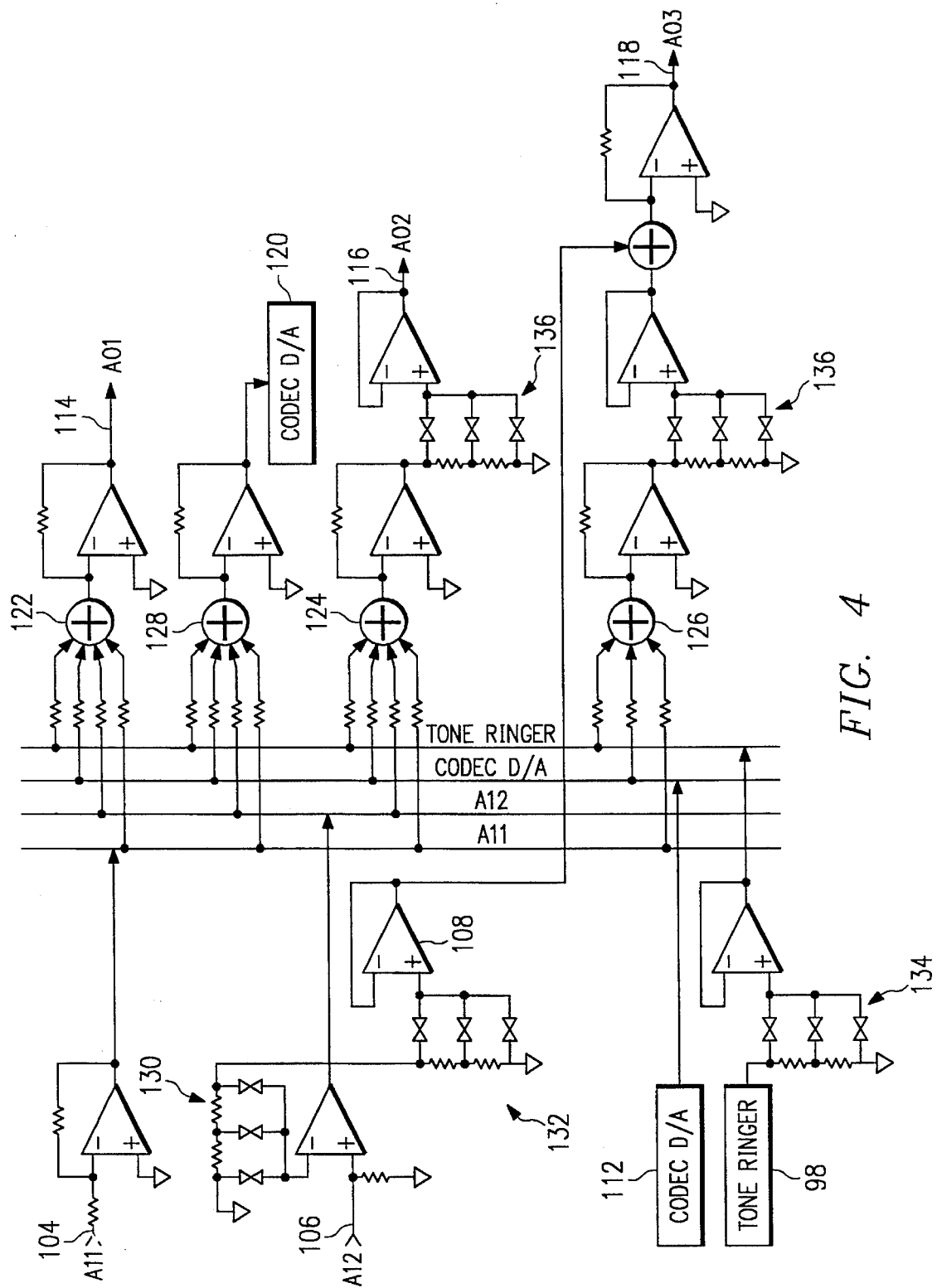
Figure 5:
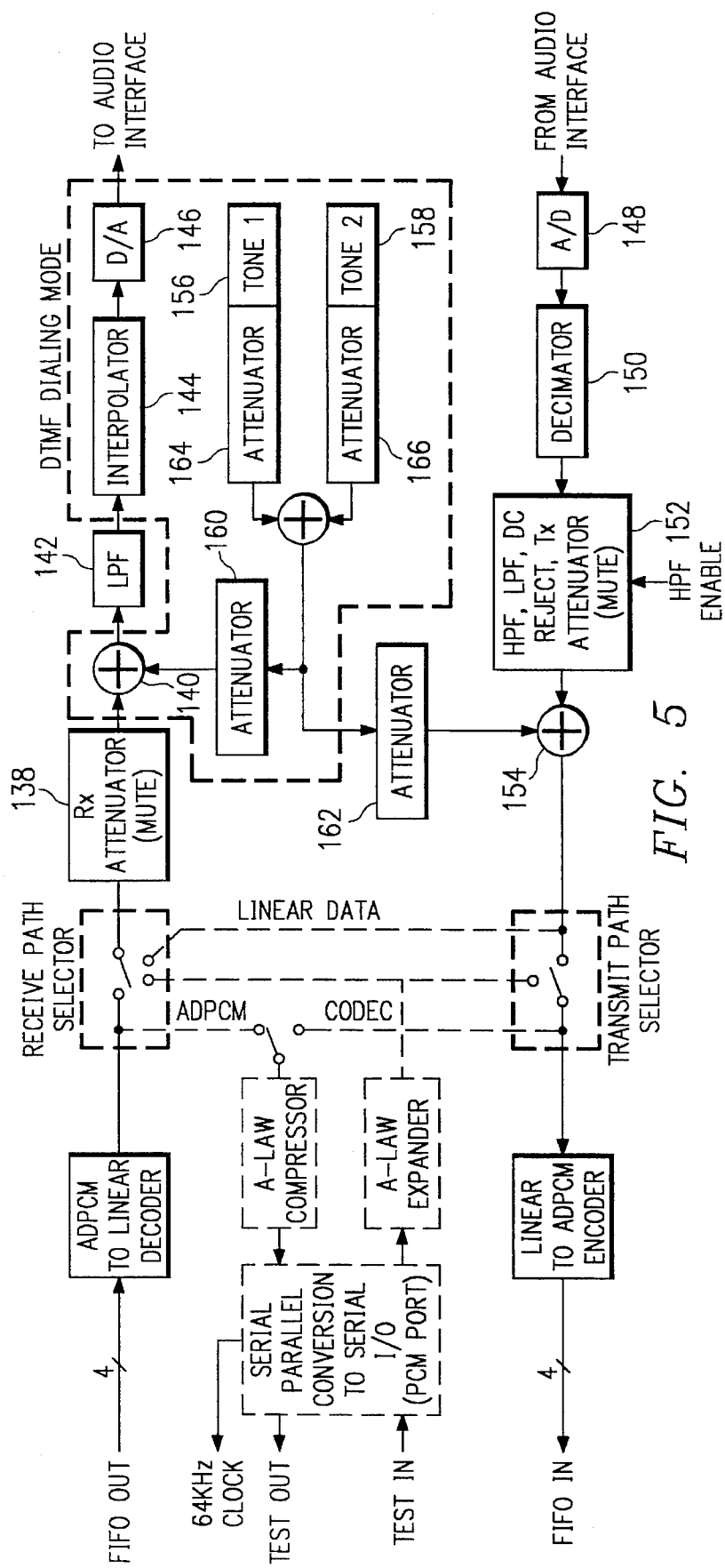

3 ence may now be had to the following detailed description taken in conjunction with the accompanying drawings wherein:

FIG. 1 is a block diagram of a handset unit of a cordless telephone into which an embodiment of the present invention has been incorporated;

FIG. 2 is a block diagram of a base unit of a cordless telephone into which an embodiment of the present invention has been incorporated;

FIG. 3 (which consists of FIGS. 3a and FIG. 3b) is a block diagram of an integrated circuit (IC) supporting an embodiment of the present invention;

FIG. 4 is a block diagram of an audio interface into which IC's such as shown in FIG. 3 have been incorporated; and FIG. 5 is a block diagram of the audio path of a cordless telephone, excluding the analog interface.

DETAILED DESCRIPTION OF THE INVENTION

As will become clear as this detailed description proceeds, the present invention comprises structure within a cordless telephone system that provides a low power, but sufficiently operational to be useful, service mode that is automatically triggered by AC main power failure. The present invention also encompasses the method of selectively enabling performed by that structure. Although the present invention could be described either from the precise structure outward to the whole system or from the whole system inward to the precise structure involved, the latter approach only is adopted herein as it most clearly, but still completely, describes both the structure and method of the present invention. Thus, herein a cordless telephone system is first described, then an IC that may be incorporated into that system, and then the analog interface of that IC. At that point, with the overall system well understood, the exact structure within that system, and the operation performed by the exact structure, can be quickly, easily, and clearly pointed out. This manner of description is also deemed particularly appropriate herein because it emphasizes function rather than structure, and thus highlights the wide scope of the present invention.

With the foregoing in mind, and referring now to the drawings wherein for convenience and clarity like or similar elements are generally referred to with the same reference numeral throughout the several views, and initially to FIGS. 1 and 2, shown therein is a cordless telephone of a type into which IC's such as are described below with respect to FIG. 3 may be incorporated. The cordless telephone includes a handset or terminal unit 2 (shown in FIG. 1) and a base unit or base station 4 (shown in FIG. 2). Base unit 4 is connected by a telephone cord to an outlet or receptacle in a wall, a telephone pole, or another fixed structure, so that it may both receive and transmit telephone message signals through a telephone network line 6 and so that it also may be powered thereby. An antenna 8 on the handset 2, and a corresponding antenna 10 on the base station 4 are used to create a communication channel between the two units by the transmission and reception of radio waves. As is conventional, handset unit 2 includes a keypad 12 for making or dialing outgoing calls, and a mouthpiece and an earpiece, with which a microphone 14 and a loudspeaker 16, respectively, are associated. A telephone number may be entered on the keypad 12, and corresponding information is transmitted over the communication channel to base unit 4, and thence to the telephone network line 6. Alternatively, when base

4 unit 4 receives a message signal from the telephone network line 6 indicating that an incoming call is present, a signal from base unit 4 causes a ringing sound in the handset unit 2 and a second ringing sound in the base unit 4 to indicate the existence of the incoming call.

The standard maximum separation of such a handset unit 2 and base unit 4, which is called the service area, is about 300 meters, and is set by the Federal Communications Commission (FCC). Typically, there are ten duplex channels permitted for each system with the upper channel having a frequency in the 49 MHz band and the lower channel having a frequency in the 46 MHz band. Of course, such operating parameters are set by the FCC and do not form a part of the present invention.

As may be seen in FIGS. 1 and 2, similar, if not identical, IC's may be used in both the handset unit 2 and the base station 4. The IC is designated by reference numeral 18 in FIG. 1 and by reference numeral 20 in FIG. 2.

It should be recognized that normal telephone practices and conventional telephone equipment mechanisms are not readily applicable to the cordless telephone area. For example, it is common in standard telephone development practice to implement features in a switch instead of in a telephone in order to reduce the cost of the telephone. In a cordless telephone, on the other hand, the consumer must buy both the base station and the handset. Thus, the cost of the handset cannot effectively be reduced at the expense of the base station; the cost of both must be minimized.

Referring again to FIGS. 1 and 2, it may be seen that the base station 4, like the handset 2, comprises a microphone 22, an ear piece 24, and a keypad 26. Likewise, both the handset 2 and the base station 4 include a ROM 28, 30, an EPROM 32, 34, an LCD and controller 36, 38, as well as a number of other elements which generally relate to the radio signals and power levels.

Reference may now be made to FIG. 3, which depicts, in block diagram form, an IC such as those incorporated into FIGS. 1 and 2;

Because of the level of sophistication of those skilled in the art and the degree of detail shown in FIGS. 1–3, no attempt will be made herein to precisely describe the functions of each pin and register within the IC shown. Such description is simply not necessary for those skilled in the relevant art to obtain a full understanding of all of the inventive aspects of the present invention. However, for the convenience of those skilled in the art, and to facilitate further discussion hereinbelow, it may be useful at this point to identify the various user accessible registers within the IC shown in FIG. 3. These user visible or accessible registers include an address decoder 76, an audio interface 78, a battery level detector 80, a clock generator 82, a codec with an associated ADPCM 84, an interrupt controller 86, a keypad scanner 88, FIFOs 90, the real time clock 74, an RSSI-A/D converter 92, a serial port 94, a logic module 96, a tone ringer 98, a transmitter modem 100, and a reset associated with the watchdog timer 102.

At this point it is appropriate to describe the audio path of an IC heretofore made and used with great success, which IC supports an embodiment of the present invention. The audio path in the actually constructed IC comprises the audio interface 78, the codec and associated ADPCM 84, a dual-tone generator (see FIG. 5), and the tone ringer 98. The codec, ADPCM, and dual-tone generator functions are implemented with the same digital signal processing (DSP) engine. Generally, the audio interface 78 connects the analog side of the codec 84 and the tone ringer 98 to the off chip microphone (e.g., element 22 in FIG. 2), ear piece (e.g., element 24 in FIG. 2), speaker (e.g., element 24 in FIG. 2), PSTN (e.g., element 6 in FIG. 2), and so on. Software controls the signal routing and amplitudes.

The audio interface 78 consists of a series of analog inputs, analog outputs, and a multiplexer connecting them, as shown in the block diagram in FIG. 4. FIG. 4, and all of the other FIGS. herein, depict all or part of the actually constructed IC heretofore mentioned. Thus, all of the FIGS in this application, as well as the discussion accompanying them, should be understood to describe the actually constructed IC. With that understood, the various gains, attenuations, and interconnections arising during operation of the IC shown in FIG. 4 are all software programmable. Each input buffer and output driver can be independently disabled to save power.

Referring still further to FIG. 4, it may be seen that the audio mux has five inputs (two pins 104, 106; a sidetone 108; the tone ringer 98; and a codec D/A 112; three pins 114, 116, 118; and the codec A/D 120). Under software control, the various inputs can be routed to each of the outputs, with some limitations. Possible paths are shown in FIG. 4. The selected inputs are summed at each output.

Those skilled in the art will notice with reference to FIG. 4 that a sidetone path is provided from the AI2 input 106 to the AO3 output 118. In the actually constructed IC, the gain is programmable from 0 dB to −42 dB in 3 dB steps.

With respect to the pins shown in FIG. 4, as those skilled in the art should be well aware, pins AI1 and AI2 are analog input pins and pins AO1, AO2, and AO3 are analog output pins. There are nine user visible registers associated with the audio interface and shown in FIG. 4, those being an AO1 MUX control 122, an AO2 MUX control 124, an AO3 MUX control 126, a codec A/D MUX control 128, an AI2 control register 130, a sidetone AI1 control register 132, a tone ringer amplitude register 134, and an AO2, AO3 attenuator control 136. The codec portion of the audio path is located between the ADPCM transcoder (heretofore identified as codec/ADPCM 84) and the audio interface 78 (See FIG. 3a). The codec portion of the audio path provides a codec function, a DTMF-only mode function, an A-Law test mode function, a loopback 2 function, and a codec/ADPCM enable control function. Each of these functions, excepting the DTMF-only function, is discussed briefly in individual paragraphs immediately below.

When the codec portion of the audio path provides a codec function, an analog to linear PCM and/or an A-Law PCM codec is provided.

In the A-Law test mode, access is provided to the codec function allowing the codec to be tested (analog into A-Law PCM out and A-Law PCM into analog out). This test mode breaks the connection between the codec and the ADPCM transcoder, performs linear to A-Law PCM and A-Law PCM to linear conversion, and provides an access point to the 64 kbps A-Law PCM bit stream. This test mode is implemented by multiplexing the PCM data I/O and clock functions onto pins normally used for the serial I/O port. In the actually constructed embodiment of the present invention, the data is transmitted and received in eight-bit bursts using a 512 kHz clock.

With respect to the loopback 2 function, a loopback point is provided connecting the output of the transmit path (input to the ADPCM encoder) to the input of the received path (input point from the ADPCM decoder). Data at this loopback, called loopback 2, is in linear PCM format.

In the codec/ADPCM enable control function, a single bit, located in the clock generator module, is provided for enabling the transmit and receive codec paths. This bit is also used to enable the ADPCM transcoder transmit and receive paths, and the A/D summing amplifier in the audio interface.

With respect to performance requirements, the codec meets standard CCITT G. 714 signal to distortion, gain tracking, frequency response, and idle channel noise specifications.

Aside from enabling the codec, programming the desired paths, and optionally enabling the high-pass filter in the transmit path, the codec module in the actually constructed IC operates without software intervention. The filters, summing points, and attenuators are implemented in microcode executed on the DSP engine.

Referring now to FIG. 5, there is shown a block diagram of the audio path, excluding the audio interface. The audio path is shown to include both a receive path and a transmit path.

Along the receive path are an attenuator/mute 138, a voice/tone summing point 140, a low-pass filter 142, an interpolator 144, and a D/A converter 146. The attenuator/mute 138 is a means to disable the receive path ahead of the voice/tone summing point. A programmable attenuator is used so that the signal can be turned off gradually. Muting is accomplished by programming the receive attenuator to an infinite attenuation. Programming minus infinity causes the ADPCM decoder to reset its recursive filters. The attenuator is programmed via a receive attenuator register. The voice/tone summing point 140 is a point at which the voice and tone signals are summed. The low-pass filter 142 is, in the actually constructed IC, simply a standard 3400 Hz low-pass filter or the like. The interpolator 144, also in the actually constructed IC, is a series of interpolators to increase the sample rate. The D/A converter 146 is a means for converting the signal from digital to analog.

In the transmit path are an A/D converter 148, a decimator 150, a filters and attenuator block 152, and a voice/tone summing point 154. The A/D converter 148 is a second order sigma/delta converter or the like which can be used to digitize the input. The decimator 150 is hardware which decimates the output of the A/D converter 148. The filters and attenuator block 152 includes an attenuator mute, a low-pass filter, a high-pass filter, and a DC reject filter. The attenuator/mute portion is a means to disable the transmit path ahead of the voice/tone summing point. A programmable attenuator may be used so that the signal can be turned off gradually. Muting is accomplished by programming the attenuator to infinite attenuation. The attenuator is programmed via a transmit attenuator register. The low-pass filter portion of the block 152 is a standard 3400 Hz low-pass filter. The high-pass filter portion of the block 152 is a 50/60 Hz rejection filter. Such a filter has a programmable enable control, that is, a DSP control register. The DC reject filter portion of block 152 removes DC offset. This filter cannot be disabled. The voice/tone summing point 154 is a point at which voice and tone signals are summed.

The test logic interface to the "PCM port" contains a parallel to serial and a serial to parallel shift register pair. The interface to the serial I/O port module is serial, with the codec module providing the parallel to serial and serial to parallel conversion, data clock (one eight-cycle burst per frame at 512 kHz), and frame sync clock (8 kHz).

There are three registers in the codec module that are user visible, those being the DSP control register, a transmit attenuator register, and a receive attenuator register. The DSP control register controls all DSP related functions, including the ADPCM module. The ADPCM portion of the audio path provides a full-duplex ADPCM transcoder (linear PCM to ADPCM and ADPCM to linear PCM). The transcoder sits between the codec and the FIFOs/B channel I/O. Hereinabove, the codec and ADPCM have been generally referred to together and with reference numeral 84. In the actually constructed IC, a test mode allows A-Law encoding and decoding to be added to the signal path for compatibility testing.

Further, with respect to the actually constructed IC, a test mode is provided allowing access to the ADPCM portion of the audio path. This allows the ADPCM transcoder to be tested independent of the audio interface and filters (A-Law PCM into ADPCM out and ADPCM into A-Law PCM out). This mode breaks the connection between the codec and the ADPCM transcoder, providing a connection point for a 64 kbps A-Law PCM bit stream. The test mode is implemented by multiplexing the PCM data I/O and clock functions onto pins normally used for the serial I/O port (the B/D channel I/O port is used for the 32 kbps ADPCM connection).

A single programming bit is provided for enabling the DSP and audio interface. This bit is the same bit that is used to enable the codec transmit and receive paths, and is located in a module enable control register 0.

The actually constructed IC complies with CCITT G. 721 bit-for-bit.

The ADPCM transcoder function is microcode executed by the DSP engine. It should be noted that the input to the encoder and the output from the decoder is in linear format (not compounded PCM because the A-Law compression and expansion blocks are not used in normal operation).

With regard to data routing on the FIFO side, the ADPCM module connects to the FIFO/B channel data multiplexer. The input to the decoder and output from the encoder is in four-bit nibbles. With regard to the data routing on the codec side, reference should be made to the block diagram of the audio path, FIG. 5. The loopback 2 and test mode switches are controlled via the DSP control register, discussed above. A tone generator capable of generating two simultaneous tones is used in the actually constructed IC. The output of the generator is individually summed into the transmit and receive paths, with independently controlled amplitudes. Under software control, the transmit and receive paths feeding the summing point can be muted, allowing only the tones to be output.

Referring to FIG. 5, the tone generator may be seen to consist of a tone 1 generation block 156, a tone 2 generation block 158, a receive path tone attenuator 160, and a transmit path tone attenuator 162.

With respect to the tone 1 and tone 2 generators 156, 158, the interface to each of these generators consists of four bytes of programming, three that specify the frequency and one that specifies the amplitude. Writing the tone 2 amplitude register causes all eight bytes to be loaded into the DSP, thus changing the tones. This also starts the tone generation. The tone generation is terminated by writing the zero amplitude value to the desired amplitude register (to turn off tone 1, the tone 1 amplitude register must be written with the zero amplitude coefficient, followed by a write to the tone 2 amplitude register to trigger the update of all 8 registers). Each of the two tone generators 156, 158 operates independently.

With respect to the receive path and transmit path attenuators 160, 162, the outputs of the two tone generators 156, 158 are summed together. The combined signal sums into the receive and transmit speech paths via the two attenuators 160, 162. The transmit and receive speech signals pass through their own programmable attenuators 164, 166 prior to reaching the summing point. This allows independent adjustment of the relative tone/speech levels for the transmit path and the receive path.

There are ten user visible registers in the dual-tone generator module. Two pairs of four registers specify the frequency and amplitude of the two tone generators, and two control the transmit tone and receive tone attenuators. The tone ringer (element 98 in FIGS. 3a and 4) is capable of generating multiple single frequency sequential square wave tones with minimal transients when switching between frequencies. The tone ringer function is capable of operating whether the codec/ADPCM 84 function is enabled or disabled.

Software programs the tone ringer with the desired frequency and amplitude, and then enables the desired audio path. The tone ringer hardware consists of a tone ringer frequency register, a tone ringer amplitude register, a counter/divider, and an attenuator. When the tone ringer is running and a new frequency is programmed into the tone ringer frequency register, the change over to the new frequency takes place only on cycle boundaries.

In the actually constructed IC, the tone ringer 98 consists of a programmable eight-bit polynomial counter and associated control logic. The input clock is 288 kHz. The output feeds the tone ringer input buffer/attenuator located in the audio interface module. A control bit located in the clock generator module turns the tone ringer 98 on and off by starting and stopping the clock. This bit also disables the tone ringer attenuator and buffer.

With the above now well understood, the present invention may be quickly and easily described. It will be recalled first of all that the codec portion of the audio path in the actually constructed IC was described as providing a DTMF-only mode function. With regard to the DTMF-only mode, the DSP engine has a DTMF-only mode that turns off all DSP functions but the dual-tone generator and those portions of the codec necessary to produce an output DTMF tones. In the actually constructed embodiment of the present invention, this mode is controlled via a bit in the DSP control register.

It should be understood and appreciated that the present invention provides a nonobvious method for dealing with emergency, power-out, circumstances. If the AC mains fail, at least some normal functions of the overall system must be disabled. Powering off one or more IC's that form the system by themselves would in turn require isolating all of the connections between the portions of the system that are powered on versus those that are powered off. This would not be nearly as cost effective as the solution provided by embodiments of the present invention. Further, the present invention builds upon a recognition that a number of functions are integrated into the IC, and embodiments of the present invention provide a simple, cost effective means to enable only those functions that are required with the minimum of power drain penalty from the remaining functions that are disabled, but cannot be powered off. According to the teachings of the present invention, functions that must be left on are the keypad scanner, the hookswitch, pulse dialer, and the DTMF dialer.

Based upon the foregoing, those skilled in the art should now appreciate that the present invention provides a cordless telephone especially well-suited to weather emergency, power out circumstances. According to the teachings of the present invention, such a cordless telephone, which telephone may be fully powered by AC main power lines and only partially powered by telephone lines, includes structure for producing dual tones, structure for producing dual-tone multifrequency tones from the dual tones, structure for empowering each of the foregoing in the event of AC main power failure where the only power available passes through the telephone lines.

The present invention also provides a method for selectively enabling cordless telephone functions in the event of an AC main line power failure, which method includes the steps of obtaining power for the public switched telephone network line and using that power to enable the cordless telephone hookswitch and dialing mechanism. In embodiments of the method of the present invention the dialing mechanism may also include a keypad scanner associated with a keypad. Also, in embodiments of the method of the present invention the dialing mechanism may include a pulse dialer, and possibly additionally a dual-tone multifrequency dialer. Accordingly, those skilled in the art should understand and appreciate that the present invention provides a low power, emergency telephone service mode in a cordless telephone base station. The present invention also provides a cordless telephone that can long maintain operational capabilities in the event of AC main power failure.

Effectively, embodiments of the present invention comprise a DSP engine that performs, in part, DTMF functions. The present invention teaches, in part, slowing the rate of operation of the DSP engine and not performing non-dialing functions in a mode in which power available is limited to power provided by telephone lines.

Obviously, numerous modifications and variations are possible in light of the teachings herein. Accordingly, within the scope of the appended claims, the present invention may be practiced otherwise than as specifically described above.

What is claimed is:

1. In a cordless telephone of the type that is directly connected for operation to a public switched telephone network line and also to an AC main line, and of the type that also has a hookswitch and a dialer, both of which are controlled by a microcontroller, a method for selectively enabling telephone functions in the event of an AC main line power failure, said method comprising the steps of:
   obtaining power from said public switched telephone network line;
   enabling said hookswitch with said power obtained from said public switched telephone network line; and
   enabling said dialer with said power obtained from said public switched telephone network line.

2. A method as recited in claim 1, wherein said cordless telephone has a keypad and a keypad scanner operatively connected thereto, and wherein said step of enabling said dialer comprises the step of enabling said keypad scanner.

3. A method as recited in claim 2, wherein said cordless telephone further has a pulse dialer, and wherein said step of enabling said dialer further comprises the step of enabling said pulse dialer.

4. A method as recited in claim 3, wherein said cordless telephone further has a dual-tone multifrequency dialer, and wherein said step of enabling said dialer further comprises the step of enabling said dual-tone multifrequency dialer.

5. A cordless telephone of the type that is directly connected for operation to a public switched telephone network line, that may be fully powered by AC main power lines and that may be only partially powered by telephone lines, said cordless telephone comprising:
   means for producing dual tones;
   means for producing dual-tone multi frequency tones from said dual tones;
   means for outputting said dual-tone multi frequency tones; and
   means for empowering said means for producing dual tones, said means for producing dual-tone multi frequency tones and said means for outputting in the event of AC main power failure, where the only power available passes through the telephone lines.

6. A cordless telephone as recited in claim 5, wherein said means for producing dual tones comprises a dual-tone generator.

7. A cordless telephone as recited in claim 6, wherein said means for producing dual-tone multi frequency tones comprises a digital signal processing engine.

8. A cordless telephone as recited in claim 7, wherein said means for outputting said dual-tone multifrequency tones also comprises said digital signal processing engine.

9. A cordless telephone as recited in claim 8, wherein said means for empowering comprises a digital signal processing engine control register.

10. A cordless telephone of the type that is directly connected for operation to a public switched telephone network line and, further, that is capable of performing, when enabled, functions related to dialing and functions not related to dialing, said apparatus susceptible to having to operate during periods in which the amount of power available is insufficient to sustain full operation, said apparatus comprising:
    a digital signal processing engine that may perform dual-tone multifrequency functions; and
    means for slowing the rate of operation of said digital signal processing engine during periods in which the amount of power available is insufficient to sustain full operation.

11. A cordless telephone as recited in claim 10, further comprising means for detecting performance of dual-tone multifreqency functions only, and means for enabling dialing functions only when said means for detecting detects performance of dual-tone multifrequency functions only.

* * * * *

UNITED STATES PATENT AND TRADEMARK OFFICE
CERTIFICATE OF CORRECTION

PATENT NO. : 5,495,530
DATED : Feb. 27, 1996
INVENTOR(S) : Peterson et al.

It is certified that error appears in the above-indentified patent and that said Letters Patent is hereby corrected as shown below:

| | |
|---|---|
| Column 2, line 56 | Replace "multi frequency" With --multifrequency-- |
| Column 3, line 10 | Replace "FIGS." With --FIG.-- |
| Column 10, line 12 | Replace "multi frequency" With --multifrequency-- |
| Column 10, line 15 | Replace "multi frequency" With --multifrequency-- |
| Column 10, line 18 | Replace "multi frequency" With --multifrequency-- |
| Column 10, line 27 | Replace "multi frequency" With --multifrequency-- |

Signed and Sealed this

Eighth Day of July, 1997

Attest:

BRUCE LEHMAN

*Attesting Officer*  *Commissioner of Patents and Trademarks*